United States Patent [19]
Wright et al.

[11] Patent Number: 5,886,352
[45] Date of Patent: Mar. 23, 1999

[54] READHEAD FOR AN OPTO-ELECTRONIC ROTARY ENCODER

[75] Inventors: David A Wright; Geoff McFarland, both of Edinburgh, United Kingdom

[73] Assignee: Reinshaw plc, Gloucestershire, United Kingdom

[21] Appl. No.: 836,150

[22] PCT Filed: Nov. 4, 1996

[86] PCT No.: PCT/GB96/02699

§ 371 Date: Jul. 1, 1997

§ 102(e) Date: Jul. 1, 1997

[87] PCT Pub. No.: WO97/16704

PCT Pub. Date: May 9, 1997

[30] Foreign Application Priority Data

Nov. 2, 1995 [GB] United Kingdom ................. 9522491.1

[51] Int. Cl.⁶ ................................................. G01D 5/34
[52] U.S. Cl. ............................... 250/231.14; 250/237 G; 356/374
[58] Field of Search ......................... 250/231.13, 231.14, 250/231.16, 237 G; 356/373, 374, 356, 345

[56] References Cited

U.S. PATENT DOCUMENTS

| | | |
|---|---|---|
| 2,886,717 | 5/1959 | Williamson et al. . |
| 3,290,175 | 12/1966 | Cusano et al. . |
| 3,951,548 | 4/1976 | Westell ................................. 250/237 G |
| 3,961,318 | 6/1976 | Farrand et al. . |
| 4,430,566 | 2/1984 | Searle ................................. 250/231.14 |
| 4,782,229 | 11/1988 | Ernst .................................... 250/237 G |
| 5,064,290 | 11/1991 | McMurtry et al. ................. 250/231.16 |
| 5,155,355 | 10/1992 | Kabaya ............................... 250/237 G |
| 5,661,296 | 8/1997 | Ishizuka et al. .................... 250/231.14 |

FOREIGN PATENT DOCUMENTS

| | | |
|---|---|---|
| A1 0-143525 | 6/1985 | European Pat. Off. . |
| A3 0-157034 | 10/1985 | European Pat. Off. . |
| B1 0-250711 | 1/1988 | European Pat. Off. . |
| A2 0-431976 | 6/1991 | European Pat. Off. . |
| A1 0-543513 | 5/1993 | European Pat. Off. . |
| A1 0-608758 | 8/1994 | European Pat. Off. . |
| 0-510516 | 1/1995 | European Pat. Off. . |
| 19 05 392 | 10/1969 | Germany . |
| B2 1-962099 | 7/1970 | Germany . |
| 25 11 900 | 9/1975 | Germany . |
| 24 51 994 | 11/1976 | Germany . |
| A1 3-209043 | 11/1982 | Germany . |
| A1 3-308841 | 10/1983 | Germany . |
| C2 3-616144 | 11/1987 | Germany . |
| A1 4-006789 | 9/1991 | Germany . |
| A1 4-427080 | 2/1995 | Germany . |
| A1 1-9522611 | 1/1996 | Germany . |
| A 61-178612 | 8/1986 | Japan . |
| A 63-174563 | 11/1988 | Japan . |
| 1-220094 | 1/1971 | United Kingdom . |
| 1-231029 | 5/1971 | United Kingdom . |
| 1-311275 | 3/1973 | United Kingdom . |
| 1-504691 | 3/1978 | United Kingdom . |
| 2-094974 | 9/1982 | United Kingdom . |
| 2-288015 | 10/1995 | United Kingdom . |

OTHER PUBLICATIONS

Clark, L et al. "Thin Film Photovoltaic Detector Arrays." International Research and Development Co, Ltd. Conference on Moire Finge Technology, Jun. 19–20, 1972, pp. 1–5.

*Primary Examiner*—Que T. Le
*Attorney, Agent, or Firm*—Oliff & Berridge, PLC

[57] ABSTRACT

A readhead for an opto-electronic encoder includes a light source, an analyser grating and a detector. The light source illuminates a scale of the opto-electronic encoder such that the light passed on by the scale forms a periodic light pattern. The analyser grating interacts with the periodic light pattern to generate a resultant fringe pattern. The resultant fringe pattern is incident upon the detector which generates a plurality of phase shifted cyclically modulating signals upon relative movement of the readhead positioned in registration with the scale. Either the periodic light pattern or the resultant fringe pattern is a linear pattern while a remaining one of the periodic light pattern and the resultant fringe pattern is an angular pattern.

7 Claims, 6 Drawing Sheets

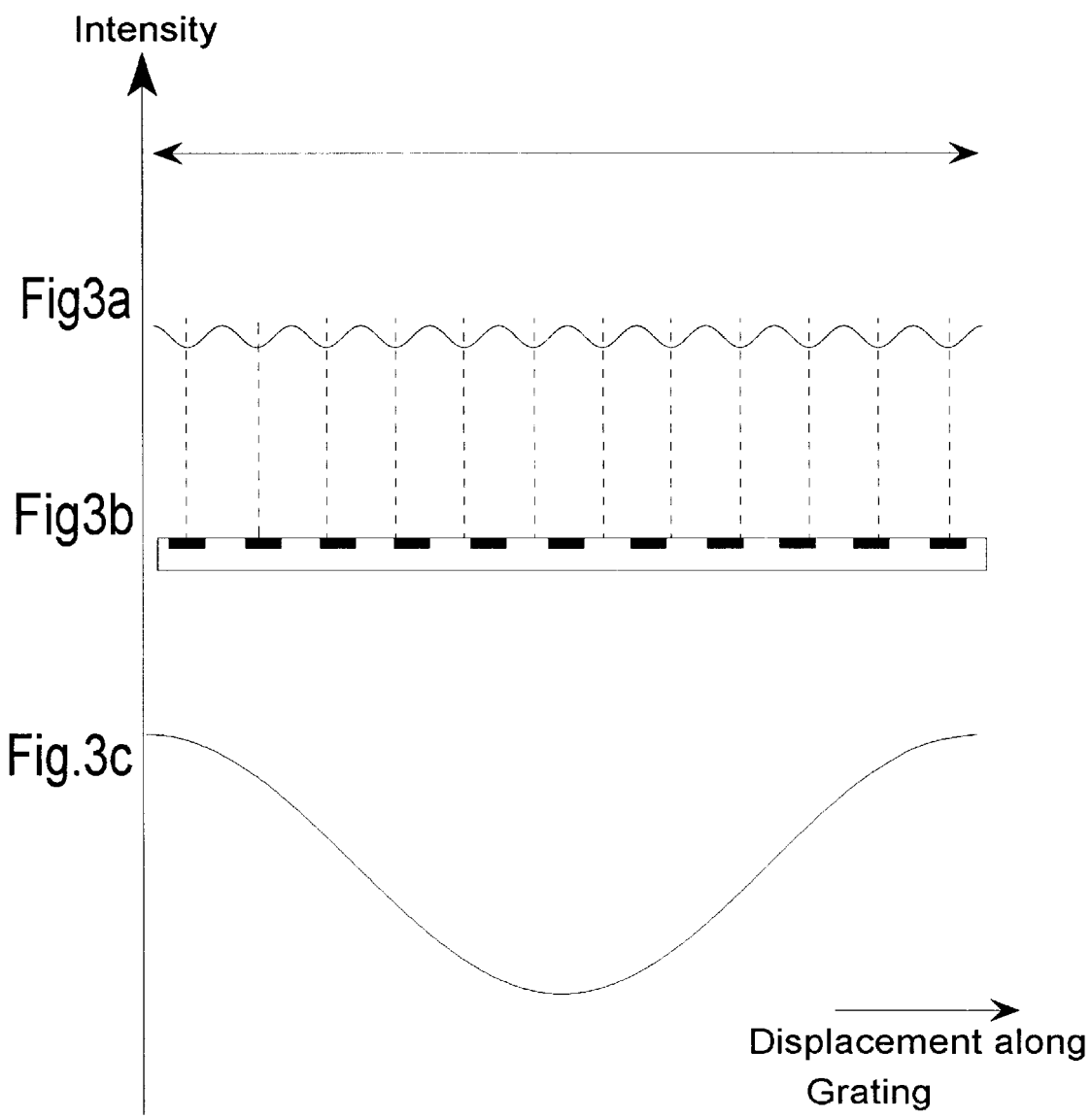
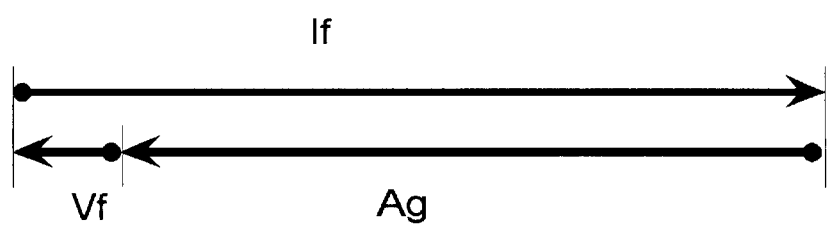
Fig.4

% ERROR DUE TO ECCENTRICITY (10 MICRONS)

READHEAD FOR AN OPTO-ELECTRONIC ROTARY ENCODER

FIELD OF THE INVENTION

The present invention relates to an opto-electronic rotary encoder which may be employed, for example, to measure angular displacement of one rotatable body relative to another.

BACKGROUND OF THE INVENTION

Such rotary encoders are known per se, and typically include a code wheel, mounted to a first one of the relatively rotatable bodies, having a plurality of radially extending, circumferentially spaced lines, situated at equi-angular intervals about the periphery of the code wheel, thereby to form a scale. An optical readhead, mounted to the other of the relatively rotatable bodies, and in register with the scale, projects light onto the scale which, depending upon the configuration of code wheel, is then either reflected or transmitted. From the reflected or transmitted light, the readhead generates a series of signals which may be used to generate an incremental count indicative of the relative angular displacement of the first and second relatively rotatable bodies.

SUMMARY OF THE INVENTION

A first aspect of the present invention provides opto-electronic encoder apparatus for measuring relative movement having a scale defined by a series of spaced apart lines, and a readhead lying in register with the scale, the scale and readhead being relatively movable in the direction of spacing of the lines; the readhead comprising:

means for illuminating the scale whereby light passed on by the scale forms a periodic light pattern;

an analyser grating for interacting with said periodic light pattern to generate a resultant fringe pattern; and a detector upon which said resultant fringe pattern is incident, for generating a plurality of phase shifted cyclically modulating signals upon said relative movement;

wherein one of the periodic light pattern and resultant fringe pattern is a linear pattern, and the other is an angular pattern.

An independent aspect of the present invention provides opto-electronic rotary encoder apparatus for measuring relative angular displacement having a scale defined by a series of spaced apart lines, and a readhead lying in register with the scale, the scale and readhead being relatively movable in the direction of spacing of the lines; the readhead comprising:

means for illuminating the scale whereby light passed on by the scale forms a periodic light pattern;

an analyser grating for interacting with said periodic light pattern to generate a resultant fringe pattern; and a detector upon which said resultant fringe pattern is incident, for generating a plurality of phase shifted cyclically modulating signals upon said relative movement, comprising:

a plurality of sets of photosensitive elements spaced apart in the direction of spacing of said resultant fringes, elements of different sets being interleaved in a repeating pattern, and all elements of a given set being electrically connected in common, wherein adjacent element are separated by a distance not equal to the fringe pitch of said resultant fringes.

BRIEF DESCRIPTION OF THE DRAWINGS

Embodiments of the invention will now be described, by way of example, and with reference to the accompanying drawings in which:

FIGS. 3a–c are signal diagrams illustrating the generation of resultant fringes;

FIG. 4 is a vector diagram;

DETAILED DESCRIPTION OF PREFERRED EMBODIMENTS

Figure 1:
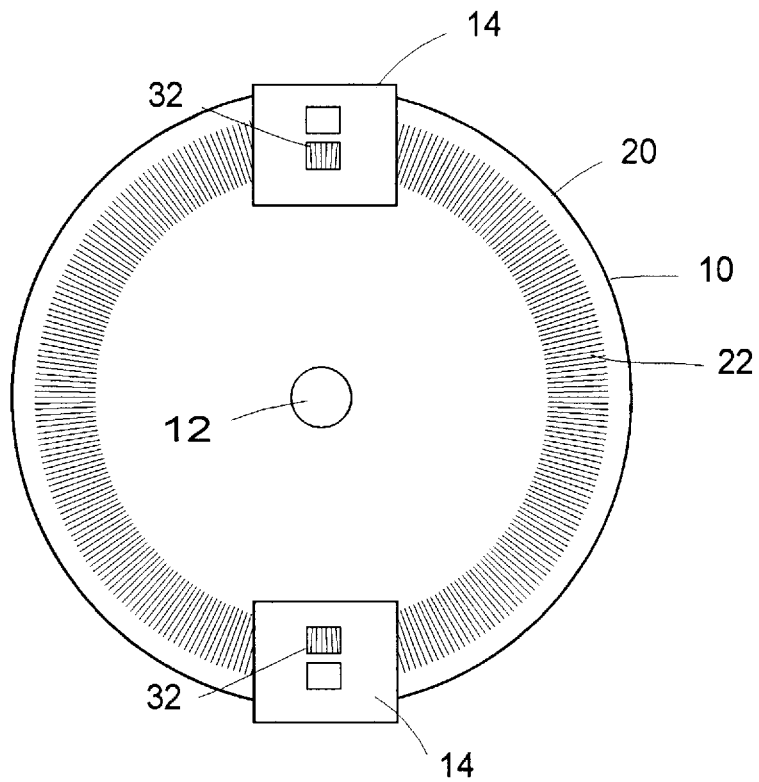
FIG. 1 is a schematic elevation of a rotary encoder in accordance with the present invention.
Figure 2:
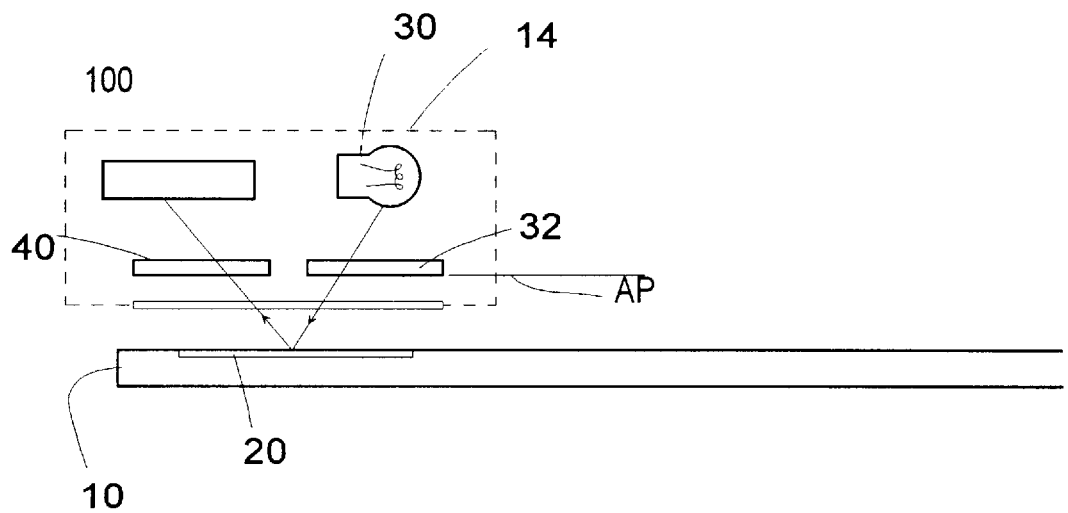
FIG. 2 is a side view on II—II in FIG. 1.

Referring now to FIGS. 1 and 2, an angular encoder for measuring relative angular displacement of two members includes a circular code wheel 10, mounted to one of the members in a manner permitting rotation about a central bearing 12, and a pair of opto-electronic readheads 14, mounted to the other of the members. The code wheel 10 has, at its periphery, a rotary scale 20, made up of a series of alternately light-reflecting and non-reflecting lines 22; the lines 22 extend radially and are circumferentially spaced from each other. Alternatively, the lines may be provided by a phase grating (known per se) type structure, etched into the surface of the code wheel 10 to generate a scale.

The readheads 14 each include a diffuse light source 30, which generates a collimated beam that illuminates the scale 20 via an index grating 32. The index grating 32 comprises alternate light transmitting and opaque lines (not shown), whose angular pitch and circumferential spacing are identical to the portion of the lines 22 of the scale 20 with which the window defined by the index grating 32 is in register. After passing through index grating 32, light is reflected from the scale 20 and, by virtue of its interaction with both index grating 32 and scale 20, a periodic light pattern in the form of interference fringes is formed in an analyser plane AP. The angular of both the lines on the index grating 32 and the scale 20, together with the stand-off distance between grating 32, and scale 20 are chosen so that a corresponding optical mechanism to the linear encoding mechanism shown in GB 1504691, applies. In accordance with this type of optical mechanism, the interference fringes formed in the analyser plane AP will have the same angular pitch as the lines of the index grating 32 and scale 20 (N.B. in an alternative optical mechanism shadow fringes may be formed).

Rotation of the code wheel 10 relative to the readhead 14 will cause rotation of the interference fringes Generated in the analyser plane AP, and a corresponding cyclically varying modulation of the intensity of light incident upon any given point in the said plane. Observation of two or more phases of this light intensity modulation will enable the determination of both the direction and magnitude of angular displacement of the wheel 10. However, direct observation of this light intensity modulation is only possible with a photo voltaic transducer whose dimensions are less than or equal to one half of the width of an interference fringe. In the present example, the linear spacing between adjacent lines of the scale 22 at their outer radius is equal to 2 microns, and this is therefore also the maximum linear spacing between adjacent fringes of the corresponding interference fringe pattern generated in analyser plane AP. It is therefore not practicable or cost efficient to construct photodetectors of the requisite size in order to monitor directly the aforementioned light intensity modulation. To make the light intensity modulation manifest to a photo voltaic transducer whose dimensions are substantially larger than the pitch of the interference fringes, an analyser grating 40 is provided in the analyser plane AP.

The function of the analyser grating 40 will now be explained with reference to FIGS. 3a–c. Referring now to FIG. 3a, the light intensity distribution of the interference fringes 50 with angle is illustrated in FIG. 3a. It can be seen that the intensity distribution is substantially sinusoidal, and that the angular pitch of the fringes is constant. The configuration of the analyser grating 40 is illustrated in juxtaposition with the fringes 50 in FIG. 3b. It can be seen from FIGS. 3a and 3b that the angular pitch of the analyser grating 40 is constant, but the juxtaposition of the grating 40 with the interference fringes 50 reveals that the angular pitch of the grating is fractionally larger than that of the fringes; the fringes having an angular spatial frequency of 12 peaks for the angular displacement of α°, while the lines of the analyser grating 40 having an angular frequency of 11 lines per angular displacement α°. As a result, when the interference fringes 50 are incident upon the analyser grating 40, what is observed from the side of the grating 40 remote from the scale 20 is a resultant fringe 60. The generation of the resultant fringe 60 may be explained in that at the central portion of the illustrated part of the analyser grating 40 the high intensity peaks of the interference fringe pattern lie in register with non-transmissive lines of the grating 40, and so comparatively little of the incident light from the interference fringes 50 is transmitted by the analyser grating 40. Toward the periphery, the high intensity peaks lie increasingly in register with light transmissive lines of the grating 40, as a result of which, more light is transmitted by the analyser grating 40. The generation of a resultant fringe 60 of this type may be likened to the generation of a beat frequency, or to a Vernier scale. For this reason, resultant fringe 60 may be referred to as a resultant Vernier fringe.

Rotational movement of the interference fringe pattern relative to the analyser grating 40 (upon rotation of the code wheel 10) by an angular displacement equal to one interference fringe pitch, will result in a corresponding shift of the resultant Vernier fringe by one resultant fringe pitch. It is therefore valid to observe the light intensity modulation occurring downbeam of the analyser grating from the shift of the resultant Vernier fringe 60 as a method of determining the angular displacement of the code wheel, since the shift of the resultant Vernier fringes 60 has a one-to-one relationship with the shift of the interference fringes 50.

Figure 5:
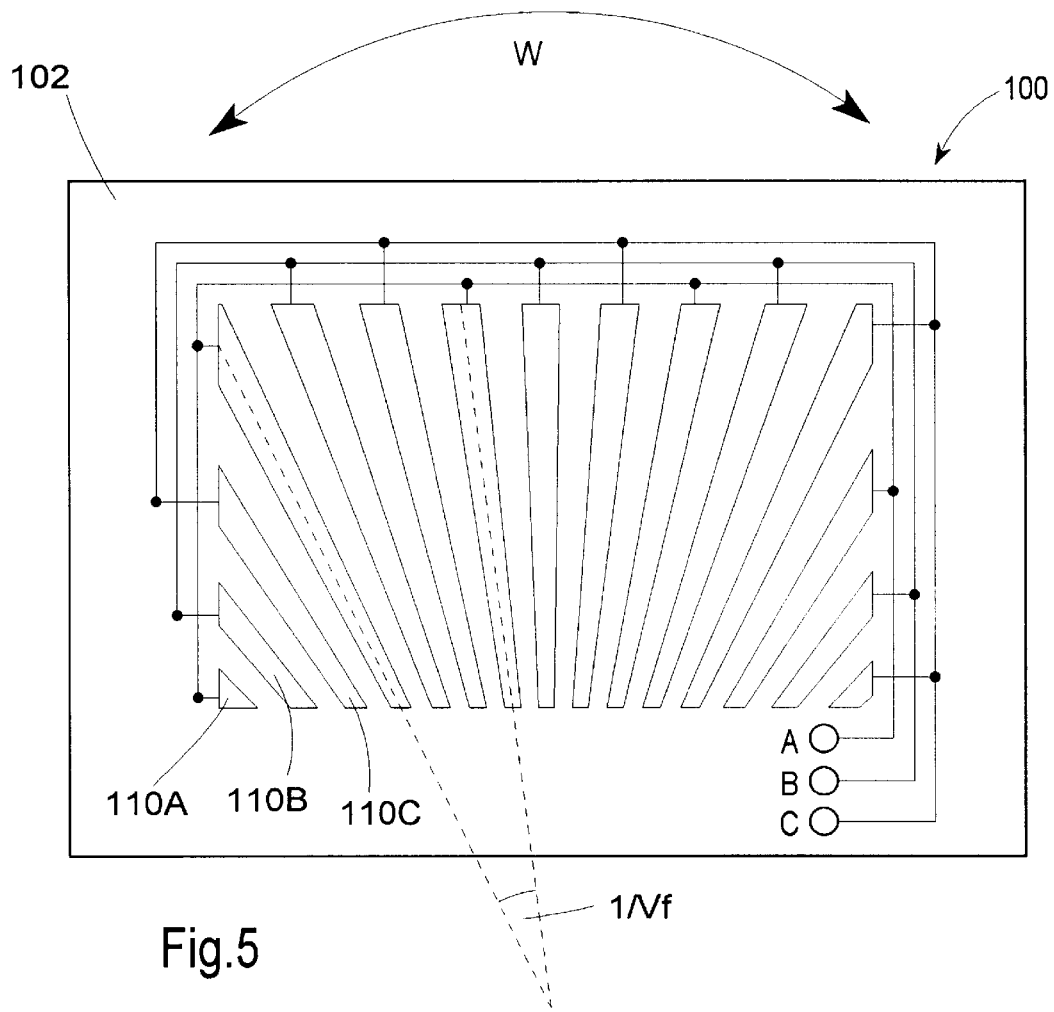
FIG. 5 is an elevation of the detector array in the readhead of FIG. 2.

Movement of the resultant Vernier fringes is detected by a structured array 100 of the type shown in FIG. 5, comprising a semiconductor substrate 102, upon which a series of photosensitive elements are formed. The elements 110 extend radially with respect to the code wheel, and are grouped into three sets 110A,110B,110C, with all elements of a given set being electrically connected in common. The elements 110 are interleaved in a repeating pattern 110A-110B-110C, and are angularly spaced such that consecutive like elements are separated by an angle $1/V_f$ equal to the pitch of a resultant Vernier fringe. As the resultant Vernier fringes move across the array, each set of elements 110 will generate a sinusoidally varying electrical output; the outputs of the three sets of elements 110A,110B,110C, having a phase relationship of 0°, 120°, and 240° respectively may then be combined in a known manner, to produce a pair of sinusoidally varying quadrature outputs, yielding the magnitude and direction of rotation of the code wheel.

The pitch of a resultant Vernier fringe generated by the interaction between an incident interference fringe pattern and an analyser grating can be calculated in advance by means of simple vector mathematics. Referring now to FIG. 4, a vector $I_f$ represents the number of fringes per unit angular displacement of the incident interference fringe pattern; the vector $A_g$ indicates the number of lines per unit angular displacement of the analyser grating; and the vector $V_f$ denotes the number of resultant Vernier fringes per unit angular displacement which will be generated as a result of interaction between the incident interference fringes and the lines of the analyser grating. The sum of these three vectors must be equal to zero. Thus, for example, if the incident interference fringe pattern has 250 fringes per unit of angular displacement, and the analyser grating has 249 lines per unit of angular displacement, there will be only 1 resultant Vernier fringe per unit of angular displacement. Thus it can be seen that the mathematics correspond to the calculation of the generation of a beat frequency between two interacting signals.

The pitch of the interference fringes, the pitch of the lines on the analyser grating and the pitch of the resultant Vernier fringes are $1/I_f$, $1/A_g$, $1/V_f$ respectively, and are angles. A further way to describe pitch in an angular encoder is in terms of circumferential spacing between adjacent lines or fringes, and this is given by the expression $$2\pi \frac{R}{N}$$

where

R is the radius (measured from the point from which the lines or fringes extend radially) at which the lines or fringes are being viewed; and N is the number of lines or fringes per revolution.

Figures 6A, 6B, 6C:
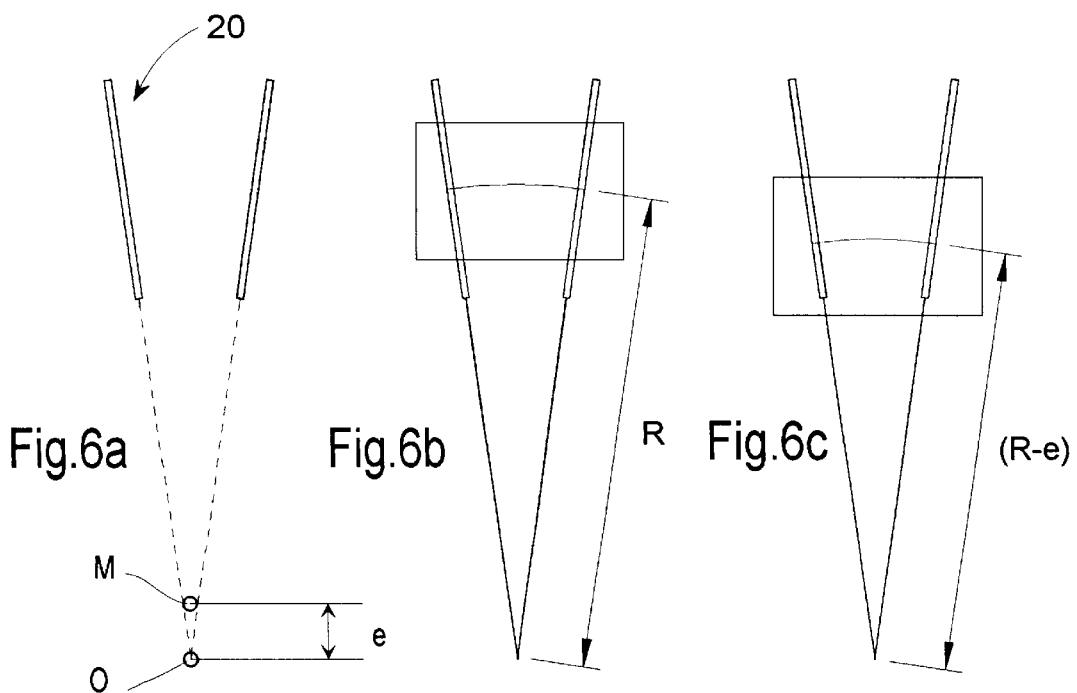
FIGS. 6a–c illustrate the effect of code wheel eccentricity.

The circumferential spacing is a significant parameter because although the apparatus described thus far has a code wheel 10 whose scale 20 is mounted with perfect concentricity, in practice it is likely that the mounting of the code wheel 10 will be eccentric. The effect of such an eccentric mounting is a change in the circumferential spacing of the scale lines with rotation of the code wheel, when viewed from the readhead. Referring now to FIG. 6a, the position of the optical center O of the code wheel 10 (i.e. the point from which all the scale lines extend radially) is illustrated relative to the mechanical center M about which the code wheel 10 rotates. The eccentricity of the scale 20 is equal to the distance between the two points and is designated as e. Referring to FIGS. 6b, the readhead 14 is mounted relative to the code wheel 10 so that at a first angular displacement of the code wheel 10 the circumferential spacing of the part of the scale with which the readhead is in register is $$2\pi \frac{r}{N}$$

where
  r is the mean scale radius.

Referring to FIG. 6c a 180° rotation of the code wheel 10 from this angular displacement will result in a change in the circumferential spacing (when taking into account the doubling effect of reflection) of the scale which lies in register with the readhead to:

$$2\pi \frac{(r-2e)}{N}$$

This change in the circumferential spacing of the scale 20 will cause a corresponding change in the circumferential spacing of the interference fringes incident upon the analyser grating, and consequently, a change in the circumferential spacing of the resultant Vernier fringes incident upon the photosensitive array 100. Because the circumferential spacing between consecutive like elements 110 of the array 100 is chosen to match the circumferential spacing of the resultant Vernier fringes, a change in the circumferential spacing of the resultant Vernier fringes from that selected for the elements 110 of the array 100 will give rise to a phase error in the electrical outputs of the array 100. If there are n photosensitive elements 110 in each set 110A,B,C of elements, and w is the circumferential distance (see FIG. 5) across the array 100, then the required circumferential spacing of the resultant Vernier fringes is:

$$\frac{w}{n}$$

using the vector analysis described above it can be shown that the new circumferential spacing q of the resultant Vernier fringes following the change in circumferential spacing of the scale is equal to $$q = \frac{1}{\frac{N}{2\pi(R-2e)} - \frac{N}{2\pi R} + \frac{n}{w}}$$

The percentage phase error x arising from this change in circumferential spacing of 1 resultant Vernier fringe is $$x = \left\lfloor \frac{w/n - q}{w/n} \right\rfloor \times 100$$

Summing for all fringes across the array, the accumulative error A is $$A = (x + 2x + 3x + 4x + \ldots nx)/n$$

$$A = (n+1)x/2$$

Figure 7:
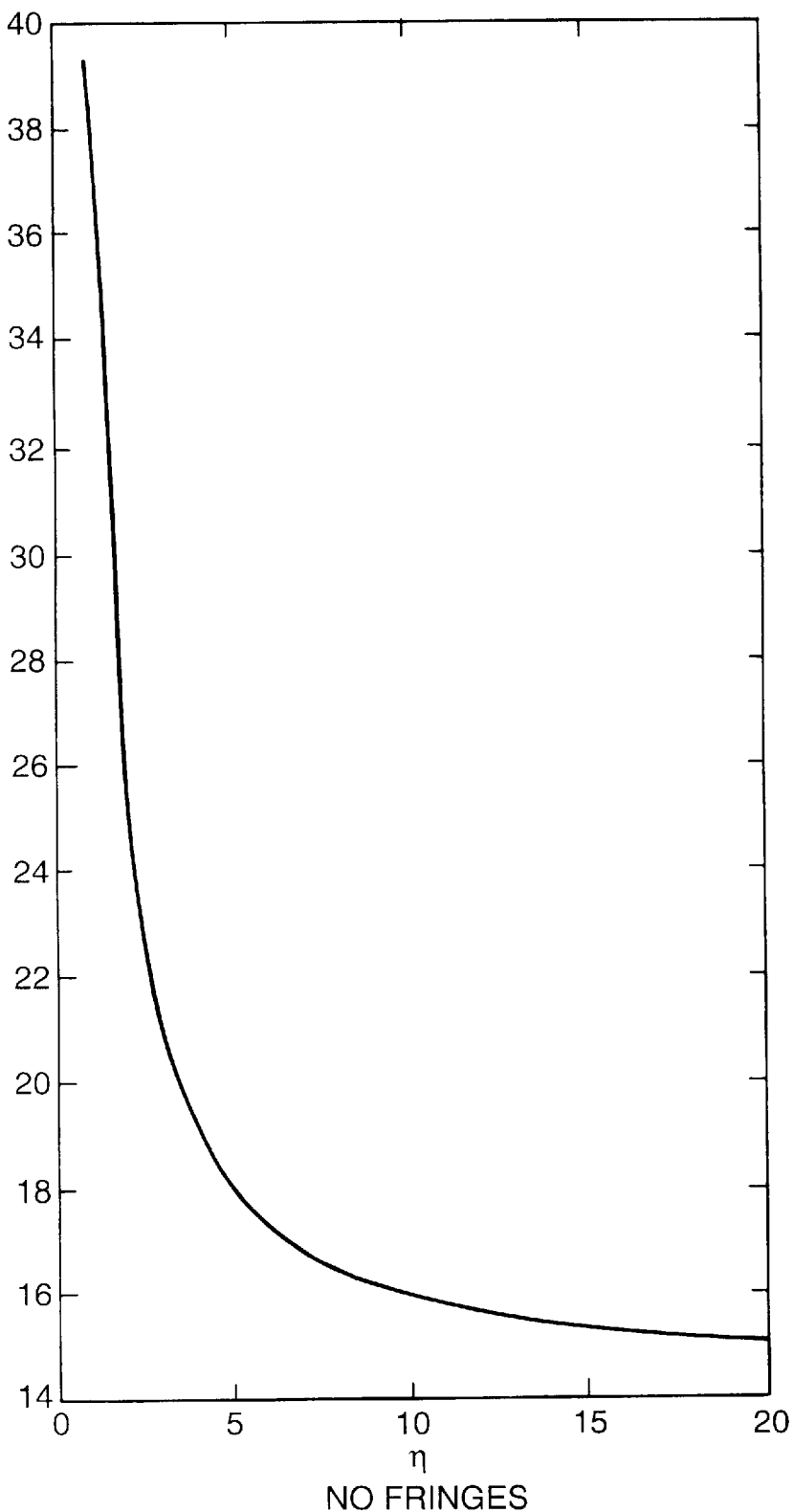
FIG. 7 is a graph showing phase error due to eccentricity.

It can be seen that for a given value of e both the absolute and percentage change in circumferential spacing of resultant Vernier fringes is smaller with increasing n. Thus, the greater the number of resultant Vernier fringes (i.e. the smaller the circumferential spacing of the resultant fringes), the lower the phase error. FIG. 7 is a graphical illustration of the change in phase error with increasing number of resultant Vernier fringes, for a 10 μm value of eccentricity and a scale of mean radius of 35.5 mm having 55800 lines per rev.

Qualitatively this phenomenon may be understood in that small pitch resultant Vernier fringes are produced when the circumferential spacings of the interference fringes (and thus the scale) and analyser grating differ by a relatively large amount. The larger this difference is, the smaller the effect proportionally of a change in the circumferential spacing of the scale (and thus the interference fringes) due to eccentricity.

Figure 8:
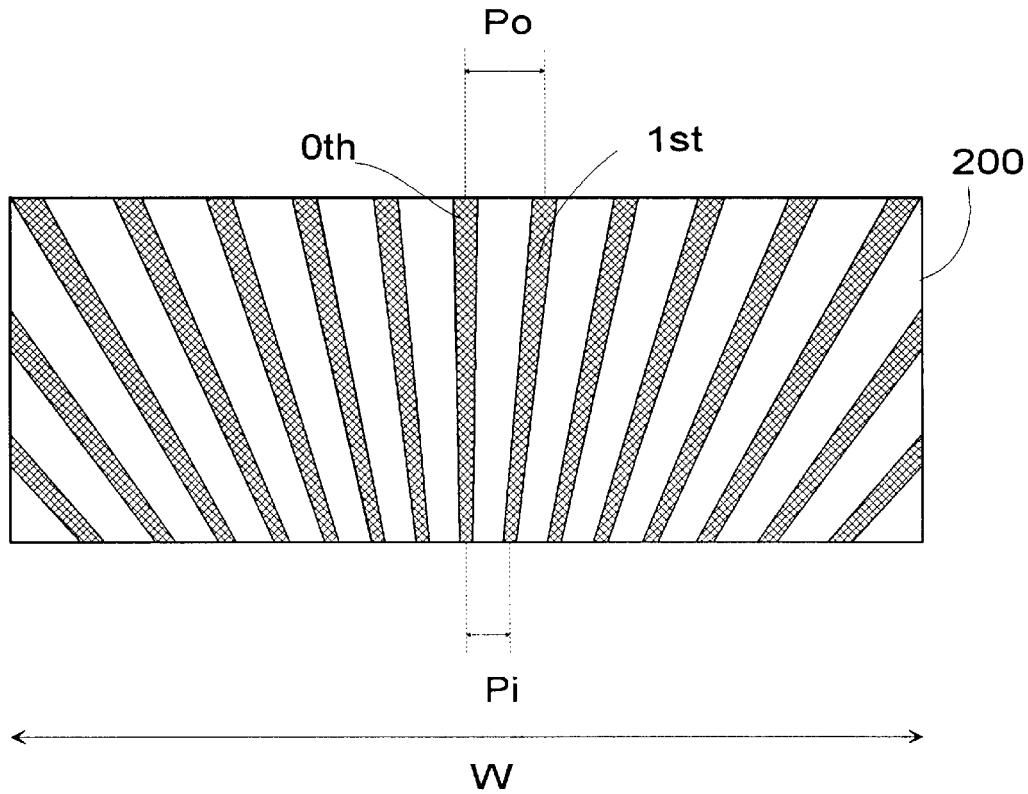
FIG. 8 illustrates the interference fringe pattern generated in the readhead of FIG. 2.

Referring now to FIG. 8, the interference fringes incident upon the window 200 defining the extent of the analyser grating are illustrated.

We have appreciated that because the geometry of the analyser grating 40 with which the inference fringes interact determines the size of the resultant Vernier fringes, it is possible to configure the analyser grating 40 to obtain any pitch and/or geometry of resultant fringes from any given incident fringes (i.e. in the examples described herein, interference fringes). For example, a parallel, or "linear" resultant Vernier fringe pattern may be generated from angular radially extending fringe pattern or vice versa.

To obtain n parallel resultant Vernier fringes across the total width w of the analyser grating 40, the configuration of the analyser grating 40 may be determined in the following way:

The linear pitch of the 1st interference fringe from the 0th fringe (0th fringe extending substantially perpendicular to the window 200 defining the boundaries of the analyser grating 40) at its inner radius within window 200 is $P_i$.

The number of lines per unit displacement (i.e. the spatial frequency) of lines at this pitch is thus given by $1/P_i$.

The required spatial frequency of resultant Vernier fringes is n fringes across an analyser window 200 of width w, i.e. n/w.

Figure 9:
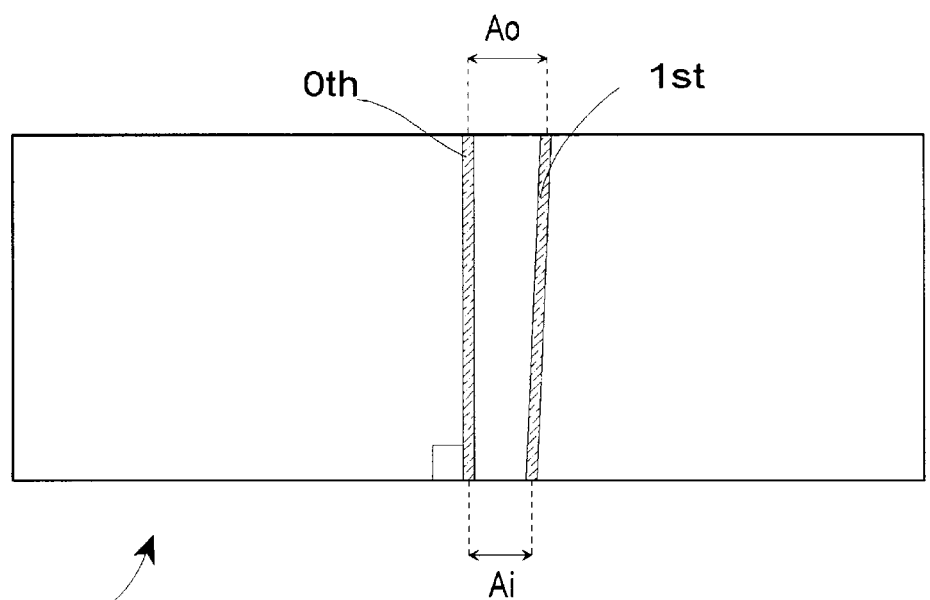
FIG. 9 is an elevation of a part of a modified analyser grating.

Referring to FIG. 9, the requisite linear pitch between the 0th and 1st line of the analyser grating at the inner radius of the analyser grating window 200 required to generate a resultant Vernier fringe of width W/N is $A_i$, corresponding to a spatial frequency of $1/A_i$.

Using the vector analysis described above, $$1/A_i = 1/P_i - n/w$$

rearranging $$A_i = wP_i/(w - nP_i)$$

In order that the resultant Vernier fringes are made to extend parallel to each other, the pitch $A_o$ between the 1st and 0th line of the analyser gating at its outer radius within window 200 must be such that it will also interact with the interference fringe to produce a resultant Vernier fringe of pitch w/n. The same calculation must therefore be repeated in respect of the 1st and 0th interference fringe to generate a value $A_o$ of pitch at the outer radius of 1st and 0th lines of the analyser grating.

Thus, $$A_o = wP_o/(w - nP_o)$$

Where $P_o$ is the pitch between the 0th and 1st fringes at the outer radius.

These calculations are then reiterated in respect of all further lines of the analyser grating, and the entire grating may then be generated by mirroring the resulting configuration about an axis of symmetry defined by the 0th line.

Figure 10:
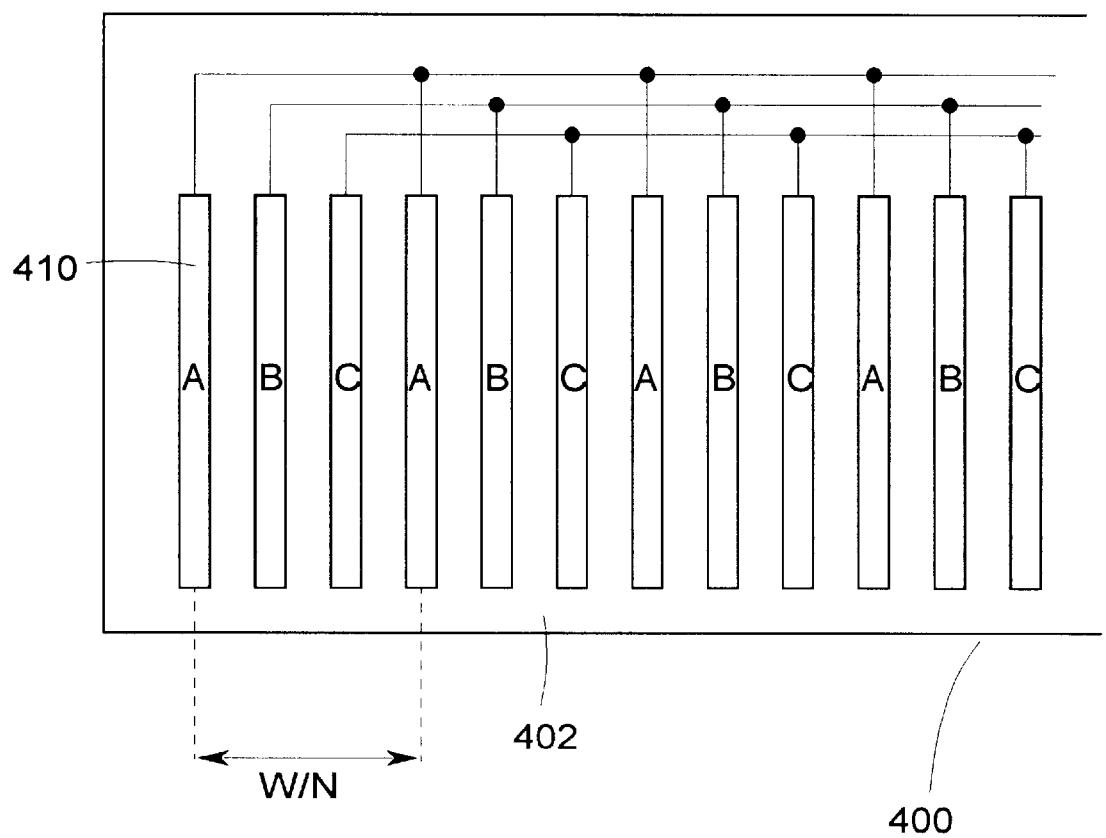
FIG. 10 is an elevation of a detector array used with the analyser of FIG. 9.

A suitably structured photodetector array 400, configured to generate three phase-shifted cyclically modulating electrical signals corresponding to the light intensity modulation of the linear resultant Vernier fringes upon rotation of the code wheel 10 is illustrated in FIG. 10. As previously the detector array 400 comprises a semi-conductor substrate 402, having provided thereon a plurality of elongate substantially parallel light sensitive elements 410, grouped into three sets 410A,410B,410C, with all elements of a given set being connected electrically in common, and with the elements being interleaved in a repeating pattern 410A-410B-410C.

The configuration of a modified or "distorted" analyser grating to generate what in this specific example are parallel resultant Vernier fringes is advantageous because it enables a single design of photodetector array to be made for both linear and angular encoders. However, an independent advantage is that, even in the case of an angularly structured photodetector array, changes in e.g. pitch or configuration of the index grating or scale may be accommodated without modifying the structure of the array; this greatly reduces the cost of modifying the encoder, since a large part of the design cost involves the design of the photodetector array.

We claim:

1. Opto-electronic encoder apparatus for measuring relative movement having a scale defined by a series of lines which are spaced apart in a circumferential direction, and a readhead lying in register with the scale, the scale and readhead being relatively movable in the circumferential direction; the readhead comprising:

means for illuminating the scale whereby light passed on by the scale forms a periodic light pattern;

an analyser grating for interacting with said periodic light pattern to generate a resultant fringe pattern one of the periodic light pattern and resultant fringe pattern is a linear pattern, and the other is an angular pattern; and a detector upon which said resultant fringe pattern is incident, for generating a plurality of phase shifted cyclically modulating signals upon said relative movement.

2. Apparatus according to claim 1, wherein said scale is a rotary scale.

3. Apparatus according to claim 1, wherein said scale is a linear scale.

4. Apparatus according to any one of the preceding claims, wherein said periodic light pattern is provided by interference fringes.

5. Apparatus according to claim 4, wherein said readhead includes a coherent light source for illuminating the scale.

6. Apparatus according to claim 4, wherein said readhead includes a diffuse light source and an index grating for illuminating the scale.

7. Apparatus according to any one of claim 1, wherein said detector comprises a plurality of sets of photosensitive elements spaced apart in the direction of spacing of said resultant fringes, elements of different sets being interleaved in a repeating pattern, and all elements of a given set being electrically connected in common, wherein adjacent elements are separated by a distance not equal to the fringe pitch of said resultant fringes.

* * * * *